United States Patent [19]

Strahan

[11] Patent Number: 4,995,460

[45] Date of Patent: Feb. 26, 1991

[54] METHOD AND APPARATUS FOR DISPOSING OF WATER AT GAS WELLS

[76] Inventor: Ronald L. Strahan, 2416 Apple Way, Edmond, Okla. 73013

[21] Appl. No.: 451,822

[22] Filed: Dec. 18, 1989

[51] Int. Cl.[5] .............................................. E21B 43/34
[52] U.S. Cl. ....................................... 166/267; 166/57; 166/75.1; 166/302; 203/12; 203/22; 203/DIG. 8
[58] Field of Search .................... 166/265, 267, 75.1, 166/57, 302; 159/901; 203/10, 12, 22, DIG. 8

[56] References Cited

U.S. PATENT DOCUMENTS

| | | | |
|---|---|---|---|
| 1,666,777 | 4/1928 | Forbes | 203/22 |
| 2,497,868 | 2/1950 | Dalin | 262/1 |
| 2,588,296 | 3/1952 | Russell, Jr. | 166/1 |
| 2,643,974 | 6/1953 | Impagliazzo | 203/22 |
| 2,688,368 | 9/1954 | Rodgers et al. | 166/267 |
| 3,057,758 | 10/1962 | Walker et al. | 134/8 |
| 3,237,689 | 3/1966 | Justheim | 166/11 |
| 3,493,050 | 2/1970 | Kelley et al. | 166/267 |
| 3,598,182 | 8/1971 | Justheim | 166/147 |
| 3,989,415 | 11/1976 | Van-Hee et al. | 417/312 |
| 4,025,235 | 5/1977 | Newbrough | 417/54 |
| 4,087,208 | 5/1978 | Uda et al. | 417/54 |
| 4,349,228 | 9/1982 | Rohde | 299/10 |
| 4,395,338 | 7/1983 | Rowton | 210/747 |
| 4,442,898 | 4/1984 | Wyatt | 166/303 |
| 4,463,803 | 8/1984 | Wyatt | 166/59 |
| 4,531,584 | 7/1985 | Ward | 166/265 |
| 4,597,437 | 7/1986 | McNabb | 166/79 |
| 4,779,677 | 10/1989 | Cobb | 166/79 |
| 4,882,009 | 11/1989 | Santoleri et al. | 166/267 |

FOREIGN PATENT DOCUMENTS 0985640 3/1965 United Kingdom .

Primary Examiner—Bruce M. Kisliuk
Attorney, Agent, or Firm—Dunlap, Codding, Peterson & Lee

[57] ABSTRACT

A method and apparatus for disposing of water at gas wells. Water from the gas-water separator is circulated through an evaporator kept partially filled with water. Hot exhaust from the gas compressor is circulated through the evaporator in heat exchange relation with the water under conditions which permit the water to vaporize. The steam is vented to the environment. Venting of the steam from the evaporator is facilitated by feeding a stream of hot exhaust from the muffler into the evaporator.

16 Claims, 2 Drawing Sheets

METHOD AND APPARATUS FOR DISPOSING OF WATER AT GAS WELLS

FIELD OF THE INVENTION

The present invention relates generally to water disposal systems and particularly to methods and apparatuses for disposing of water produced by a gas well.

SUMMARY OF THE INVENTION

The present invention comprises a method for disposing of water produced by a gas well assembly which assembly includes a gas compressor which produces hot exhaust. The method comprises circulating the water from the well in heat exchange relation with the hot exhaust under conditions permitting the water to vaporize. The steam produced is vented.

The present invention further comprises an apparatus for disposing of water produced at a gas well assembly which assembly includes a gas compressor which produces hot exhaust. The apparatus comprises a vessel for containing water in heat exchange relation with the hot exhaust. THe apparatus includes means for venting steam from the vessel.

Still further, the present invention comprises a gas well assembly. The assembly comprises a gas well and means for pumping the product of the gas well to the surface. Means for separating water from the product of the well and means for holding the separated water are included. A gas compressor is provided for compressing gas produced by the well, and the compressor is characterized as producing a hot exhaust. Means for conducting gas from the water separator means to the gas compressor is included. Further, means is provided for circulating water from the water holding means in heat exchange relation wit the hot fluid under conditions which permit the water to vaporize. Means for venting steam from the circulating means also is included.

DETAILED DESCRIPTION OF THE PREFERRED EMBODIMENTS

Most gas wells produce quantities of salt water along with the gas. Because of the salt content, the water cannot be drained off onto the surrounding terrain as it would kill the vegetation and harm animals. Therefore, the proper disposal of the salt water is essential. Consequently, in most instances the salt water must be collected and hauled to approved dump sites. This procedure is time consuming and very costly.

The present invention provides a convenient and inexpensive way to dispose of the water produced by gas wells. Equipment commonly in use at most gas wells can be modified and augmented easily and economically to function in accordance with the present invention.

Figure 1:
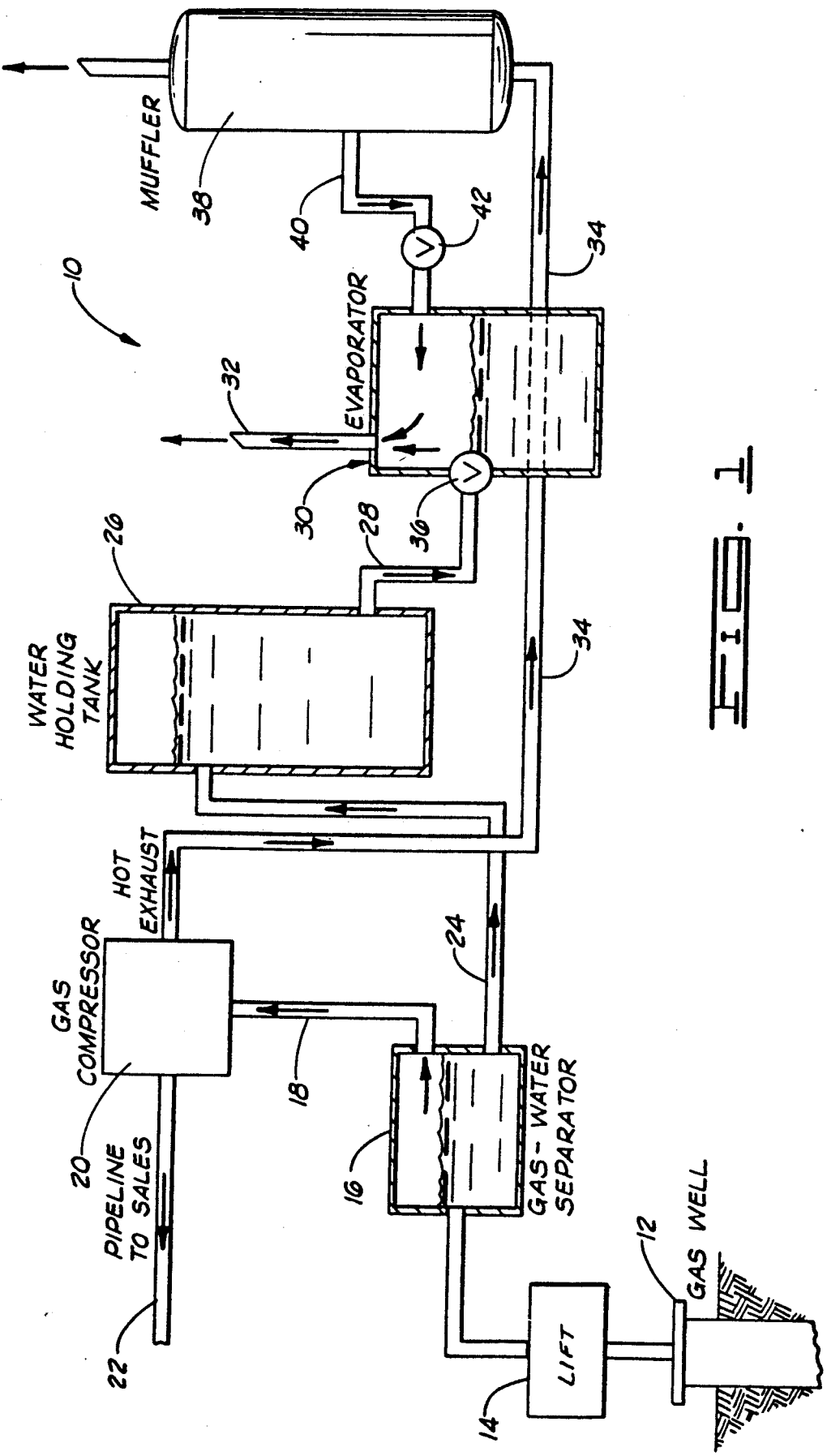
FIG. 1 is a diagrammatic view of a water disposal assembly constructed in accordance wit the present invention.

With reference now to the drawings in general and to FIG. 1 in particular, shown therein and designated by the reference numeral 10 is a gas well assembly constructed in accordance with the present invention. The assembly 10 comprises a gas well 12. A lift mechanism 14 sometimes is used to lift the product of the well to the surface and conduct it to a gas-water separator 16.

Most gas wells produce gas at a pressure lower than is required for introduction into a collecting pipeline by which the gas is distributed for sale. Accordingly, the gas from the gas-water separator 16 is conducted by an output line 18 to a gas compressor 20. The gas compressor 20 compresses the gas to a pressure compatible with the collecting pipeline 22.

Most compressors used at gas wells are of the reciprocating type. However, other types of compressors, such as turbine compressors, may be used in practicing the present invention. The only requirement for the compressor is that it be characterized by a hot exhaust.

As used herein, "hot" refers to a temperature high enough to vaporize water, or greater than 212 degrees Fahrenheit. The hot exhaust line from a typical gas compressor of the reciprocal type is about 500 degrees Fahrenheit to 700 degrees Fahrenheit, which is well above the minimum temperature required. Turbine compressors produce an exhaust as hot as 1000 degrees Fahrenheit.

The water produced by the well 12 is conducted from the gas-water separator 16 by the conduit 24 to a holding tank 26. The size and construction of the holding tank 26 will vary depending on the volume of water produced by the well 12. Preferably, the tank 26 is large enough to contain at least several times the average daily volume of water produced by the well 12.

A conduit 28 connects the water holding tank 26 to an evaporator which in the embodiment described herein is a large vessel 30. A pipe 32 extends from the top of the vessel 30 for venting steam therein, usually to the outside environment.

A conduit 34 carrying hot exhaust from the gas compressor 20 extends through the vessel 30 so that the portion of the conduit 34 inside the vessel 30 is submerged int he water contained therein. The conduit may take the form of two or more pipes or of coils. The only requirement for the conduit 34 is that it permits the water from the holding tank 26 to be circulated in heat exchange relation with the hot exhaust. As a result, the water is vaporized producing steam which can be vented safely. It will be understood that the shape and size of the vessel and of the conduit may be varied substantially so long as the necessary heat exchange relation between the exhaust and the water is maintained.

A valve 36, such as a float valve or some other suitable device, preferably is included for controlling the input of the water from the holding tank 26 to the vessel 30 in response to the volume of water in the vessel. Thus, as water in the form of steam leaves the vessel 30 through the pipe 32, it is replaced by more water from the holding tank 26.

As with most gas wells, the assembly 10 of the present invention preferably also includes a muffler 38 for reducing the noise produced by the exhaust from the compressor 20. In accordance with this invention, the conduit 34 leaving the vessel 30 connects to the muffler 38.

A stream of exhaust from the muffler 38 can be employed to promote the venting of steam from the vessel 30. To this end a conduit 40 connects the muffler 38 to the vessel 30. A valve 42 may be included for controlling the rate at which exhaust from the muffler 38 enters the vessel 30.

As indicated previously, the evaporator of the present invention may take many forms. However, the preferred construction of the vessel 30 is depicted in FIGS. 2-5, to which attention now is directed.

Figure 5:
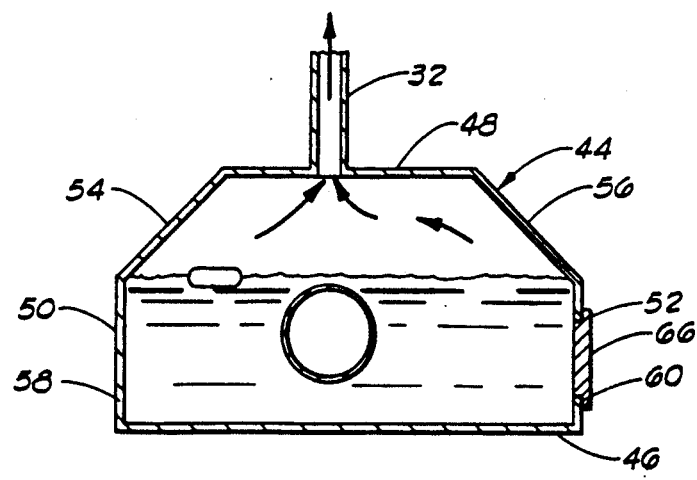
FIG. 5 is a sectional view taken along line 5—5 of FIG. 2.

As shown in FIG. 5, the vessel 30 comprises a housing 44 formed of a rectangular bottom 46 and a rectangular top 48, the bottom being wider than the top. Each of the sides 50 and 52 comprises an upper panel 54 and 56 and a lower panel 58 and 60. The upper panels 54 and 56 slope inwardly to meet the edges of the top 48. Ends 62 (FIG. 3) and 64 (FIG. 4) are shaped to conform to the edges of the sides, top and bottom.

The vent pipe 32 is positioned near one end of the to 48. The housing 44 preferably is equipped with a removable panel 66 for permitting entry into the vessel 30 for cleaning the vessel of residue and other particulate matter which may collect in the vessel from time to time. The conduit 34 carrying the hot exhaust enters at one end 62 and exits at the other end 64. Preferably, the pipe 28 from the water holding tank 26 enters at the end 62. The pipe 40 from the muffler 38 (shown only in FIG. 1) preferably connects to the housing 44 at the end 64 a distance from the vent pipe 32.

The housing 44 may be formed of any sturdy, waterproof material capable of withstanding the temperatures involved. Cold rolled steel is suitable. Connecting pipes, fi metal, can be welded to the housing. In any event the connections, including the removable panel 66, should be substantially leakproof. Further, the housing 44 may be insulated with matted insulation or some other suitable material. This increases the heat inside the housing 44 and protects workers in the immediate area as well.

The size and configuration of the vessel 30 an the conduit 34 should be adjusted to provide for an interface having a surface area sufficient to cause evaporation of water at about the rate at which water is produced by the well. If the total surface area of the portion of the conduit 34 which is inside the housing 44 is too small relative to the volume of water, the water may not be heated efficiently. Conversely, if the surface area of the conduit 34 is too large relative to the volume of water, heat will be wasted.

As a guide, the temperature of the hot exhaust in the conduit 34 leaving the vessel may be noted. The exit temperature preferably is about 250 degrees Fahrenheit or greater. The exit temperature should be well above the required 212 degrees Fahrenheit. A temperature of much greater than 250 degrees indicates that a larger surface area could be utilized to evaporate water more rapidly.

Figure 2:
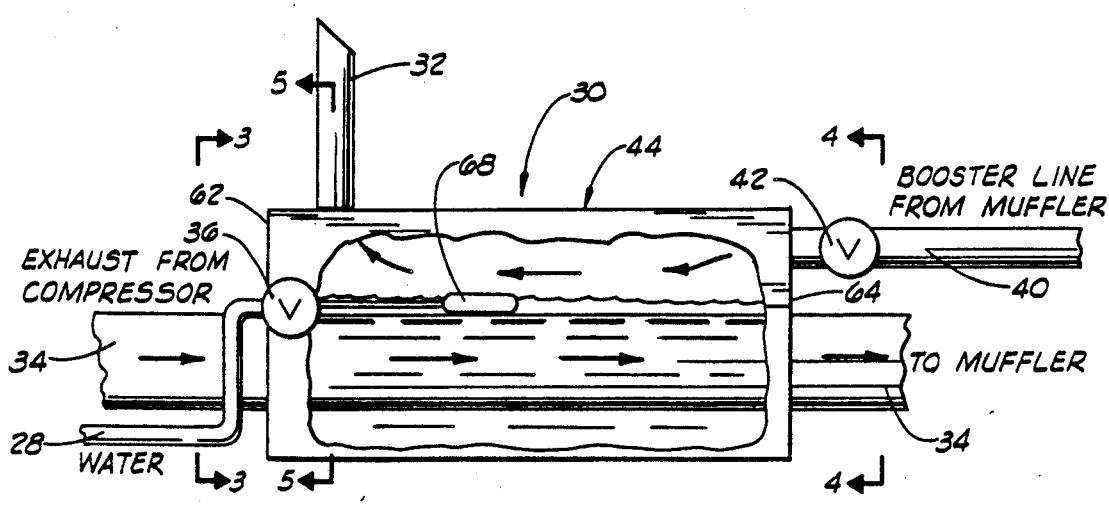
FIG. 2 is a side elevational view of the evaporator component of the assembly of the present invention. A portion of the side wall of the evaporator has been removed.
Figures 3, 4:
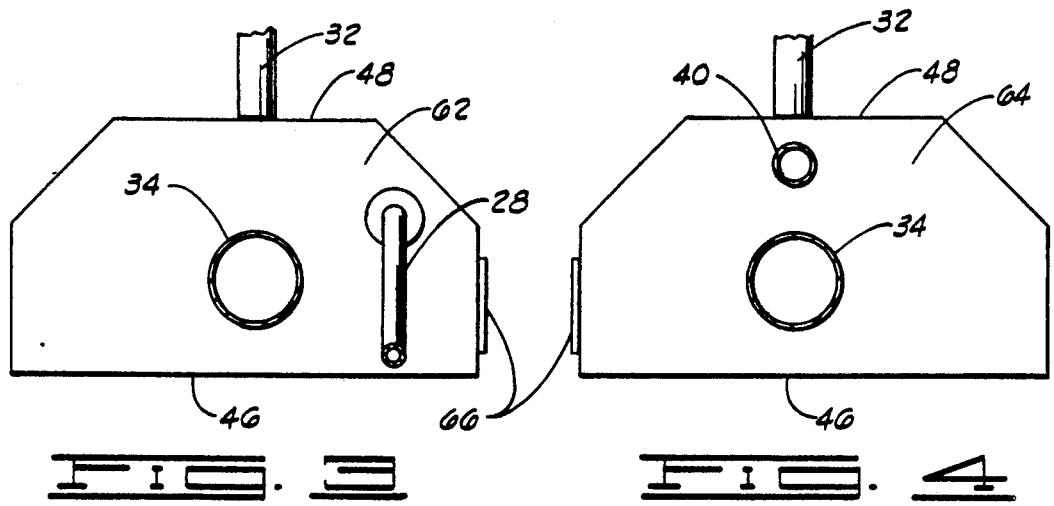
FIG. 3 is a sectional view taken along line 3—3 of FIG. 2.
FIG. 4 is a sectional view taken along line 4—4 of FIG. 2.

The operation of the vessel 30 is depicted in FIG. 2. Water flows into the housing 44 through the pipe 28. Preferably the housing 44 is kept only partially filled. Hot exhaust in the conduit 34 transfers heat to the water causing the water to vaporize.

The steam exits the vessel 30 through the vent pipe 32. To facilitate the movement of steam out the vent pipe 32, a stream of exhaust from the muffler 28 (FIG. 1) is introduced into the upper portion of the housing 44. The flow of exhaust from the muffler 28 is adjusted by the flow valve 42, which is of known construction. As the water level in the housing 44 drops due to evaporation, the float 68 drops opening the float valve 36 allowing more water to enter the housing 44 through the pipe 28.

Over a period of time a salty residue and other particulate matter may collect at the bottom of the housing. This is simply remedied by shutting down the assembly 10 briefly. The flow through the pipe 28 is cut off and the water in the housing 44 is allowed to evaporate. Then, the panel 66 is removed and the housing 44 is cleaned. It is not necessary to cut off the gas compressor if care is taken not to touch the surface of the conduit 34 which is quite hot. Of course, the line 40 from the muffler 28 should be closed during the cleaning procedure.

Now it will be appreciated that the present invention makes the disposal of water at gas wells both convenient and inexpensive. The energy for driving the apparatus, hot exhaust, is provided by other equipment already in use at the well site, namely the gas compressor. No additional energy is required. Moreover, the apparatus itself is simply constructed and thus, inexpensive to manufacture and easy to maintain.

Changes may be made in the combination and arrangement of the various parts, elements, steps and procedures described herein without departing from the spirit and scope of the invention as defined in the following claims.

What is claimed is:

1. A method for disposing of water produced by a gas well assembly, which gas well assembly includes a gas compressor which produces hot exhaust and a muffler for muffling the noise of the exhaust from the gas compressor, the method comprising:
   circulating the water in heat exchange relation with the hot exhaust under conditions permitting the water to vaporize, wherein such circulation is carried out in a vessel through which a conduit carrying the hot exhaust is submerged;
   venting steam produced by such circulation; and
   feeding a stream of hot exhaust from the muffler through the vessel for promoting the venting of steam from the vessel.

2. An apparatus for disposing of water produced at a gas well assembly, which gas well assembly includes a gas compressor which produces hot exhaust and a muffler for muffling the exhaust noise from the gas compressor, the apparatus comprising:
   a vessel for containing water from the well in heat exchange relation with the hot exhaust;
   means for introducing a stream of exhaust from the muffler through the vessel to promote the venting of steam from the vessel; and
   means for venting steam from the vessel.

3. The apparatus of claim 2 further comprising:
   means responsive tot he volume of water in the vessel for controlling the input of water into the vessel.

4. The apparatus of claim 2 further comprising means for permitting entry into the vessel for cleaning the vessel.

5. The apparatus of claim 4 further comprising: means responsive to the volume of water in the vessel for controlling the input of water into the vessel.

6. A gas well assembly comprising:
   a gas well;
   means for separating water for the product of the well;

means for conducting the product of the gas well to the water separating means;

means for holding water received from the water separating means;

a gas compressor for compressing gas produced by the well, the compressor characterized as producing hot exhaust;

means for conducting gas from the water holding means into heat exchange relation with the hot exhaust from the gas compressor under conditions which permit the water to vaporize; and means associated with the water circulating means for venting steam.

7. The gas well assembly of claim 6 wherein the means for circulating water in heat exchange relation with the hot exhaust from the gas compressor comprises a vessel adapted to receive water from the well and through which such water is submerged a conduit carrying the hot exhaust, and wherein the assembly further comprises means responsive to the volume of water in the vessel for controlling the input of water into the vessel from the water holding means.

8. The gas well assembly of claim 7 further comprising:

a muffler for muffling the noise of the exhaust from the gas compressor; and means for introducing a stream of exhaust from the muffler through the vessel to promote the venting of steam from the vessel.

9. The gas well assembly of claim 8 further comprising means for permitting entry into the vessel for cleaning the vessel.

10. An apparatus for disposing of water produced at a gas well assembly, which gas well assembly includes a gas compressor which produces hot exhaust and a muffler for muffling the noise of the exhaust from the gas compressor, the apparatus comprising:

means for receiving water from the well in a reaction zone in which the water received from the well is reacted under heat exchange conditions with hot exhaust from the gas compressor;

means for reacting hot exhaust int he muffler with the water int eh reaction zone; and means for venting steam produced by the heat exchange reaction.

11. The apparatus of claim 10 wherein the reaction zone of the means for receiving water from the well and for reacting the water received from the well in heat exchange relation with hot exhaust from the gas compressor is defined by a vessel having a conduit extending therethrough for carrying the hot exhaust whereby water in the vessel is vaporized.

12. The apparatus of claim 11 in which the vessel further comprises means for permitting entry into the vessel for cleaning the vessel.

13. The apparatus of claim 10 further comprising means for regulating the amount of water received by the water receiving means.

14. The apparatus of claim 10 wherein the means for reacting the water received from the gas well in heat exchange relation wit the hot exhaust comprises a solid surface heated by the hot exhaust so that water contacting the surface is vaporized.

15. A method for disposing of water produced by a gas well assembly comprising a gas compressor which produces hot exhaust and a muffler for muffling the noise of the exhaust from the gas compressor, which method comprises the steps of:

reacting hot exhaust from the gas compressor with water from the well under heat exchange conditions which permit the water to vaporize;

conducting hot exhaust from the gas compressor through the muffler;

reacting water from the well with hot exhaust from the muffler under heat exchange conditions which permit the water to vaporize; and venting steam produced by the heat exchange reactions.

16. The method of claim 15 wherein the heat exchange reactions are carried out in a vessel adapted for containing water from the well, the vessel having a conduit extending therethrough for carrying hot exhaust from the gas compressor so that the water in the vessel contacts the surface of the conduit, and wherein a stream of hot exhaust from the muffler is fed into the vessel.

* * * * *

UNITED STATES PATENT AND TRADEMARK OFFICE
CERTIFICATE OF CORRECTION

PATENT NO. : 4,995,460
DATED : February 26, 1991
INVENTOR(S) : Ronald L. Strahan It is certified that error appears in the above—identified patent and that said Letters Patent is hereby corrected as shown below:

Col. 1, line 23, please delete the word "THe" and substitute therefor the word --The--.

Col. 1, line 36, please delete the word "wit" and substitute therefor the word --with--.

Col. 1, line 43, please delete the "wit" and substitute therefor the word --with--.

Col. 2, line 47, please delete the words "int he" and substitute therefor the words --in the--.

Col. 3, line 21, please delete the word "to" and substitute therefor the word --top--.

Col. 3, line 35, please delete the word "fi" and substitute therefor the word --if--.

Col. 4, line 57, please delete the words "tot he" and substitute therefor the words --to the--.

UNITED STATES PATENT AND TRADEMARK OFFICE
CERTIFICATE OF CORRECTION

PATENT NO. : 4,995,460
DATED : February 26, 1991
INVENTOR(S) : Ronald L. Strahan It is certified that error appears in the above—identified patent and that said Letters Patent is hereby corrected as shown below:

Col. 5, line 8, please delete the words " means for conducting gas from the water holding" and substitute therefor the words --means for conducting gas from the water separator means to the gas compressor; means for circulating water from the water holding--.

Col. 5, line 44, please delete the words "int eh" and substitute therefor the words --in the--.

Signed and Sealed this

Thirteenth Day of October, 1992

Attest:

DOUGLAS B. COMER

Attesting Officer

Acting Commissioner of Patents and Trademarks